United States Patent [19]

Lautzenhiser et al.

[11] Patent Number: 5,012,165
[45] Date of Patent: Apr. 30, 1991

[54] CONVEYANCE WITH ELECTRONIC CONTROL FOR LEFT AND RIGHT MOTORS

[76] Inventors: Lloyd L. Lautzenhiser, Box 244, Nobel, Ontario, P0G 1G0; John L. Lautzenhiser, 4929 Malden Road, Windsor, Ontario, N9E 3T7, both of Canada

[21] Appl. No.: 482,461

[22] Filed: Feb. 21, 1990

Related U.S. Application Data

[62] Division of Ser. No. 927,273, Nov. 4, 1986.

[51] Int. Cl.⁵ .............................................. H02P 7/00
[52] U.S. Cl. ...................................... 318/53; 318/61; 318/259
[58] Field of Search .................. 318/52, 56, 57, 67, 318/68, 69, 87, 53, 58, 269, 272, 61, 64, 259, 99, 257, 55, 260, 365, 369, 375; 180/6.3, 6.48, 19.1, 19.3, 60, 65.1, 142, 143, 79.1

[56] References Cited

U.S. PATENT DOCUMENTS

| | | | |
|---|---|---|---|
| 3,596,154 | 7/1971 | Gurwicz et al. | 318/52 X |
| 3,646,414 | 2/1972 | Gurwicz | 318/67 X |
| 3,720,863 | 3/1973 | Ringland et al. | 318/67 X |
| 3,760,246 | 9/1973 | Gurwicz et al. | 318/99 X |
| 3,909,689 | 9/1975 | Selby et al. | 318/257 |
| 3,970,160 | 7/1976 | Nowick | 318/67 X |
| 4,059,786 | 11/1977 | Jones et al. | 318/17 |
| 4,228,386 | 10/1980 | Griffith | 318/584 X |
| 4,369,397 | 1/1983 | Read | 318/53 X |
| 4,415,049 | 11/1983 | Wereb | 318/67 X |
| 4,471,273 | 9/1984 | Melocik et al. | 318/139 X |
| 4,489,256 | 12/1984 | Brodsky | 318/87 |
| 4,495,449 | 1/1985 | Black et al. | 318/63 X |
| 4,500,818 | 2/1985 | Konrad et al. | 318/52 |
| 4,511,825 | 4/1985 | Klimo | 318/67 |
| 4,558,558 | 12/1985 | Horner, Jr. et al. | 180/19.3 X |
| 4,667,136 | 5/1987 | Bell | 318/53 X |

FOREIGN PATENT DOCUMENTS 2201597 7/1973 Fed. Rep. of Germany ........ 318/69

Primary Examiner—William M. Shoop, Jr.
Assistant Examiner—A. Jonathan Wysocki
Attorney, Agent, or Firm—Wendell E. Miller

[57] ABSTRACT

A conveyance (10) is provided with automatic limiting (223) of the rate of change in power supplied to first (26a or 232a) and second (26b) motors, whether the motors are electrical or hydraulic; and dynamic braking of electric motors (26a and 26b) is achieved by shorting a motor winding (150a) during a portion (233a) of an interval (217a) between power pulses (207a) of a pulse-width-modulated driving voltage (209a).

21 Claims, 8 Drawing Sheets

CONVEYANCE WITH ELECTRONIC CONTROL FOR LEFT AND RIGHT MOTORS

This is a division of U.S. patent application Ser. No. 06/927,273, filed Nov. 4, 1986.

BACKGROUND OF THE INVENTION

1. Field of the Invention

The present invention relates to controlling devices for electric or fluid actuators, and to conveyances propelled by electric or fluid actuators. More particularly, the present invention relates to a controlling device that provides accuracy in the control of speed and direction of electrically or hydraulically propelled vehicles, that limits the rate of change in the difference of rotational speed of left and right propulsion motors, and that provides dynamic braking for electric motors.

2. Description of the Prior Art

Conveyances of various types, for transporting people, for material handling, and for propelling self-propelled machinery, have requirements for extremely high maneuverability.

One way to obtain extremely high maneuverability is to separately and variably control the speed and direction of rotation of left and right wheels or other traction elements. When the traction elements are moving at the same speed, but in opposite directions, the conveyance will pivot around in a fixed location, giving the ultimate in maneuverability.

In the design of some larger conveyances, such as bulldozers, it has been customary to use a system of clutches and brakes to control both the direction of rotation and the speed of endless tracks. While the use of clutches and brakes do provide extremely high maneuverability, including pivotal turns, the control of the direction of movement is far from being precise.

Systems using clutches and brakes for steering are not satisfactory for use with vehicles that must manuever in close quarters. For instance, small fork lift trucks that are used to unload boxcars and truck trailers need better control of maneuverability than can be attained by the use of clutches and brakes.

One way to attain more precise control of the speed and direction of the wheels, or other traction elements, is to convert the power into electric or hydraulic power, and then to utilize the controllability that is available with the use of electric or hydraulic power to separately and variably control the speed and direction of rotation of left and right propulsion motors.

However, achieving high maneuverability by separately controlling the velocity and direction of rotation of the wheels, or other traction elements, may make a conveyance difficult to control, or even dangerous.

For instance, it is desirable for some field harvesting machines, such as swathers, to have the ability to make pivotal turns; but it would be dangerous to attempt to make a pivotal turn at full harvesting speed.

If the rate of change of speed of the individual wheels is limited, then the machine will be sluggish in acceleration, and may be dangerously slow in deceleration.

The problem of controllability is particularly acute in wheelchairs or other conveyances which are steered by separately and variably controlling the speed of rotation and direction of rotation of the wheels.

Typically, a separate D.C. electric motor has been drivingly connected to left and right of the wheel of a wheelchair by chains or belts, and by friction rollers that separately engage the rubber tires of the wheels.

D.C. electric motors are capable of producing variable speeds that are in accordance with the electrical power that is delivered to them, and to the load that is imposed upon them. D.C. electric motors are also capable of reversible operation by reversing the electrical potential that is applied to the terminals.

Thus, manually actuated controls have been provided that separately and variably supply electric power from a battery to left and right propulsion motors to provide changes in speed, to provide turns, to reverse the direction of movement, and to make pivotal turns by rotating one wheel forward and the other wheel backward.

One popular type of manual control includes a control lever that is moved forward in accordance with a desired speed forward, that is moved rearward in accordance with a desired speed in reverse, that is moved both forward and to one side to make a turn while moving forward, that is moved directly to one side to make a pivotal turn.

However, many who are disabled have severe hand tremors that render them unable to use electrically propelled wheelchairs.

The hand tremors have not posed a serious problem for control of forward and reverse speeds, because hand tremors do not particularly effect the flexing action of the wrist that is used to control forward and reverse operation. Also, friction between the forearm and the armrest of the wheelchair helps to steady the arm.

But, those with severe hand tremors have been unable to control electrically propelled wheelchairs because hand tremors are primarily a torsional movement of the wrist, and the torsional tremor increases tremendously as an effort is made to position the control lever.

Thus, as a person with severe hand tremors has tried to control the positioning of the control lever, the tremor in his hand has moved the control lever rapidly from one side to the other, giving signals for first one, and then the other motor to rotate faster, resulting in rapid turns in one direction and then the other, and resulting in such erratic movement that he has not been able to control the wheelchair without bumping into other patients, furniture, doors, and walls.

Another problem that has attended prior art designs is that, even for those who do not have hand tremors, control of speed and direction has been uncertain because of the lack of dynamic braking. For instance, when the control lever has been positioned to reduce the electrical power to the left propulsion motor and thereby turn to the left, inertia of the wheelchair and occupant has driven the left propulsion motor through the drive train that connects the left propulsion motor to the left wheel; and the wheelchair has not responded by turning as signalled by the control lever.

A third problem has been a relatively poor overall efficiency of the drive trains that connect the electric motors to respective ones of the wheels; so that an unnecessarily large and heavy battery has been required.

Typical prior art designs have been so heavy and so unwieldy to transport that the usual way of transporting them has been to load them into a van by the use of a hydraulic lift. This has drastically reduced the mobility of the patient, has detrimentally reduced his opportunities to visit away from his home or the care facility, or has resulted in unnecessarily high expense for a vehicle that will accommodate both the patient and his wheelchair.

Even for the electric wheelchairs that have not been so unwieldy that they cannot be transported in a station wagon or in the trunk of a sedan, the excess weight of both the wheelchair and the battery have made it a strenuous job for friends or relatives to disassemble the wheelchair, load the wheelchair and battery separately into a car, reassemble the wheelchair at another location, and repeat the process when they return the patient to the care facility.

However, if prior art designs of electrically propelled wheelchairs had used drive trains with better efficiencies, particularly better efficiency when inertia of the conveyance and occupant is driving the electric motor, then the problem of insufficient dynamic braking, particularly in making turns, would have been more severe.

A fourth problem has been inadequacy, or the entire lack, of automatic dynamic braking in the power-off condition.

A fifth problem has been in poor contact life of the relays that are used to reverse the potentials of the electric motors, resulting in unnecessary expense, and resulting in loss of use of the wheelchair for extended periods of time while spare parts are being obtained and needed repairs are being made.

There are thousands of incapacitated people who would be able to gain a greater degree of self reliance, and some would be able to become a part of the work force of their country if they were able to control some type of self-propelled conveyance.

Thus the present invention can help handicapped people gain a better sense of dignity and self-worth, and to help many of them become productive members of society.

SUMMARY OF THE INVENTION

The present invention provides a power driven conveyance in which power to left and right propulsion motors is separately and variably controlled in response to a manually positioned control, similar to the type used with computer games.

The control lever is oriented with relation to the conveyance so that moving the control lever forward results in maximum power in the forward direction being delivered to both the left and right propulsion motors.

In like manner, maximum power in the rearward direction is delivered to both motors when the control lever is moved directly rearward, maximum power is delivered to the left and right motors in opposite directions and pivotal turns are achieved when the control lever is moved directly to one side or the other, and various percentages of power in forward and reverse directions are provided when the control lever is positioned at various distances from the neutral position in various directions.

Manual positioning of the control lever separately and variably actuates the wiper arms of left-propulsion and right-propulsion potentiometers. Each of the potentiometers provides two variable resistances, one from the arm to one leg thereof, and another from the arm to the other leg thereof.

The following description will describe operation for only one of the motor drives, since both sides function the same, and both clarity and brevity are best achieved in this manner.

The right-propulsion potentiometer cooperates with a signal supply voltage of eight volts that is applied across its legs and functions as a voltage divider to provide a right-propulsion signal.

The right-propulsion signal is supplied as the input to two operational amplifiers. When the right-propulsion signal is more than four volts, one of the operational amplifiers provides a forward-rotation signal for controlling the right propulsion motor; and when the right-propulsion signal is less than four volts, the other of the operational amplifiers provides a reverse-rotation signal for controlling the same propulsion motor.

A forward-propulsion comparator receives the forward-rotation signal and cooperates with a first power transistor to actuate a forward-polarity relay. In like manner, a reverse-propulsion comparator receives the reverse-propulsion signal and cooperates with a second power transistor to actuate a reverse-polarity relay. The forward-polarity and reverse-polarity relays control the polarity of the driving voltage that is supplied to the right propulsion motor, and thus control the direction of rotation of the right propulsion motor.

But, the actual supplying of electrical power, and the varying of the electrical power that is supplied, is controlled by separate means which functions as follows.

The system uses two diodes to receive the forward-rotation signal and the reverse-rotation signal, and to develop a power-control signal. The power-control signal varies from zero to four volts when an attenuation control is adjusted to allow maximum speed and power; and the power-control signal is attenuated to lower maximum voltages when lower maximum acceleration, speed, and power are desired.

A sawtooth generator and the power control signal cooperate with a comparator to develop a pulse-width-modulated control signal whose pulse widths are proportional to the magnitude of the power-control signal.

The same sawtooth generator also cooperates with a comparator in the left-propulsion circuitry to develop a pulse-width modulated control circuit that cooperates with other components for driving the left-propulsion motor.

The pulse-width-modulated control signal cooperates with a transistor to provide a pulse and brake signal. The pulse and brake signal is pulse-width modulated as is the pulse-width control signal, but is amplified in power.

The pulse and brake signal controls two field-effect transistors. The first field-effect transistor receives the pulse and brake signal and pulses a connection to ground, so that the supply voltage is pulsed to the right-propulsion motor, thereby supplying a pulse-width-modulated driving voltage to the right propulsion motor. The width of the pulses determines the effective driving voltage.

It should be remembered that the polarity of the supply voltage that is applied to the right propulsion motor has been determined by the forward-rotation and reverse-rotation relays, and the first field-effect transistor determines the width of the pulses of the supply voltage that are applied to the right propulsion motor.

The second field-effect transistor cooperates with the pulse and brake signal to short the motor winding of the right propulsion motor during at least a portion of the no-power intervals that separate the voltage pulses of the pulse-width-modulated driving voltage.

This shorting of the motor windings during a portion of the no-power intervals between pulses causes the right propulsion motor to operate as an electrically loaded generator, and to provide dynamic braking.

However, if the motor winding were shorted for even a small portion of the time when pulses of the driving voltage were being applied to the motor winding, severe damage would be done to the circuit components. Thus a delay circuit is provided that prevents this occurrence.

The delay circuit includes diodes, resistors, and the parasitic capacitance of the field-effect transistors, and provides a time-interval between the end of one pulse of the pulse-width-modulated driving voltage and shorting of the motor winding.

The delay circuit also provides a time-interval between the cessation of shorting the motor winding and the start of the next pulse of the effective driving voltage.

The present invention includes means for limiting the rate of change in the difference of power that is delivered to the left-propulsion and right-propulsion motors, while leaving the change in the rates of power that can be delivered substantially unaffected when the rates of change of power to both motors is generally equal.

In the preferred configuration, a capacitor which is connected across the arms of the two potentiometers, limits the change in the control voltages when the control lever is positioned in a manner that changes the resistances of the left-propulsion and right-propulsion potentiometers differently, and one of the propulsion signals tries to change more rapidly than the other propulsion signal. But, when the control lever is positioned to equally increase or decrease the power to both motors, the voltages of the right and left propulsion signals change equally and the capacitor does not see a difference in differential voltage; therefore, the differential limiting circuit does not affect acceleration or deceleration when changes in electrical power are substantially equal to both propulsion motors.

This limiting of the rate of the difference in power delivered to the two motors provides a conveyance that can be controlled by people having severe hand tremors; because the spurious signals produced by hand tremoring are time-averaged.

In addition to dynamic braking and differential change limiting, the present invention provides extended relay life and dynamic braking when no pulses of power are being supplied to the motor.

The field-effect transistors cooperate with the relays to pulse the power after the relays are closed, and to cease delivering power before the relays open, thereby avoiding arcing across the relay contacts, and thereby resulting in greatly extended service life for the relays.

In their unenergized state, the relays short the motor winding, thereby achieving power-off dynamic braking even when the battery is removed from the conveyance.

In summary, the present invention provides a conveyance, a motor drive, and a control, in which: dynamic braking is provided by shorting the motor winding during a portion of the intervals between power pulses; differential control limiting provides ease and accuracy of control by limiting the rate of change in the difference of power that can be supplied to one motor with respect to the other motor; power-off dynamic braking is achieved by shorting the motor winding when no power pulses are being supplied to the motors; and extended relay life is achieved by preventing the relay contacts from making or breaking under load.

Differential control limiting is applicable to both electric and fluid motors; dynamic braking is applicable to any electric motor that is driven by voltage pulses whether width-modulated, amplitude-modulated, or unmodulated; power-off dynamic braking is applicable to various uses, particularly with permanent magnet motors; and the circuitry for increasing relay life is particularly applicable to reversible electric motors that are driven by pulsed driving voltages.

DESCRIPTION OF THE PREFERRED EMBODIMENTS

Figure 1:
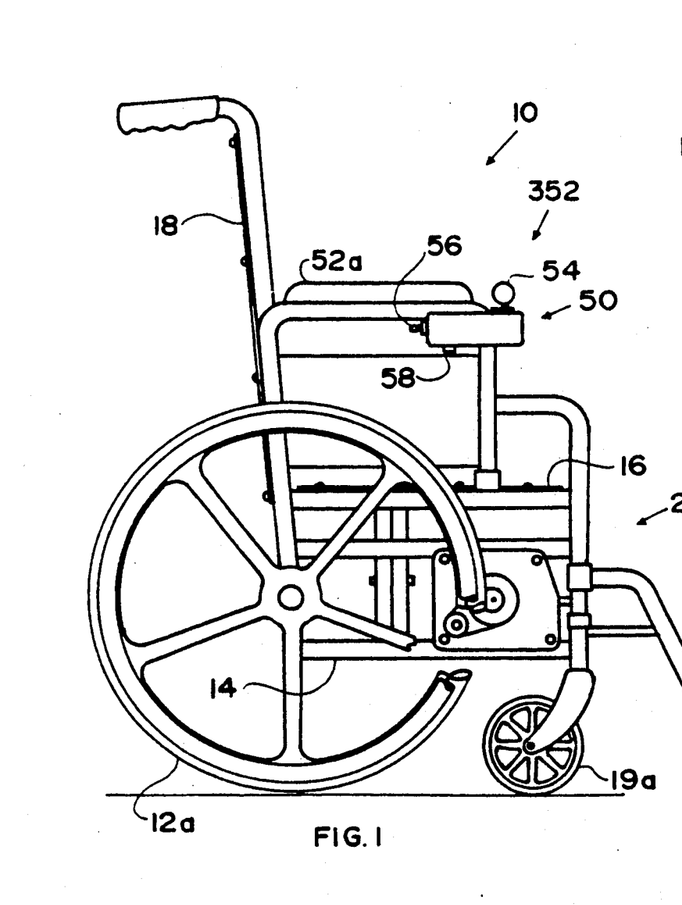
FIG. 1 is a side elevation of a conventional wheelchair to which the electric motor drive of the present invention has been added.
Figure 2:
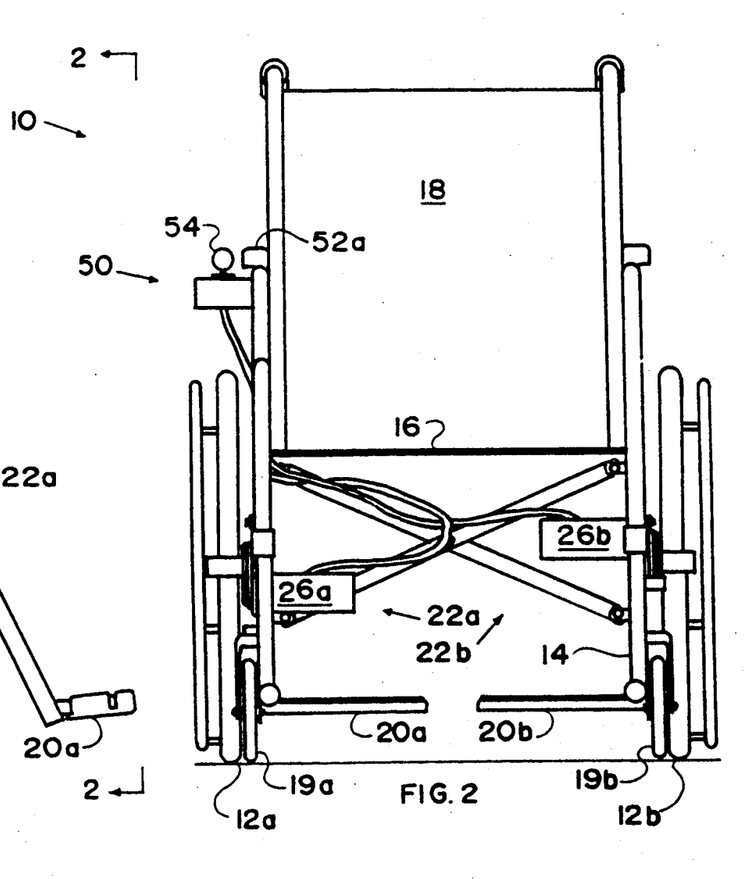
FIG. 2 is a front elevation of the electric wheelchair of FIG. 1, taken substantially as shown by view line 2—2 of FIG. 1.

Referring now to the drawings, and more particularly to FIGS. 1 and 2, an electric wheelchair 10 includes large wheels, or propulsion elements, 12a and 12b that are attached to a frame 14, a seat bottom 16 and a seat back 18 that are both attached to the frame 14, castor wheels 19a and 19b that are attached to the frame 14, and footrests 20a and 20b that are attached to the frame 14. The wheelchair discussed thus far is typical of the prior art.

The electric wheelchair 10 includes two drive units, 22a, and another drive unit, not shown, but generally a mirror image of the drive unit 22a.

Figure 3:
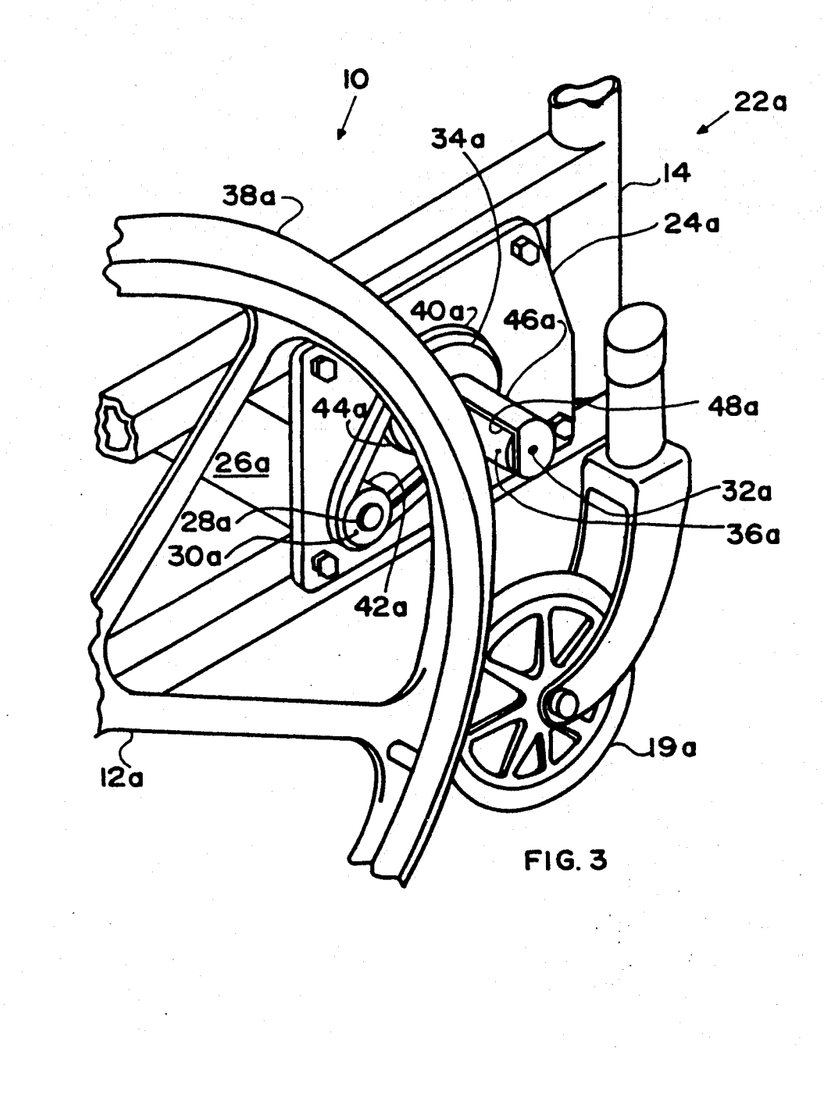
FIG. 3 is a perspective view of the drive unit of the electric wheelchair of FIG. 1, taken at a perspective angle that is upward and rearward from that of FIG. 1.

Referring now to FIG. 3, the drive unit 22a includes a mounting plate 24a which is secured to the frame 14 of the wheelchair 10, a first electric motor, or right electric motor, 26a of the permanent field-magnet type which is mounted to the mounting plate 24a and which includes a motor shaft 28a that extends through the mounting plate 24a, a small pulley, or drive pulley, 30a which is mounted onto the motor shaft 28a, a stationary spindle 32a which is attached to the mounting plate 24a and which extends orthogonally outward therefrom, a large pulley, or driven pulley, 34a which is rotatably mounted onto the stationary spindle 32a, a drive roller 36a which is fixedly secured to the large pulley 34a and which drivingly engages a tire 38a of the wheel 12a, and two belts 40a which preferably are O-rings of a synthetic elastomer, and which engage grooves 42a of the small pulley 30a and grooves 44a of the large pulley 34a.

A roller guard 46a is disposed circumferentially around the drive roller 36a, is fixedly attached to the stationary spindle 32a, and includes a longitudinal slot 48a which allows the drive roller 36a to engage the tire 38a.

As seen in FIG. 2, a second motor, or left motor, 26b is at a different height than the right motor 26a; so that the motors, 26a and 26b, bypass each other when the wheelchair 10 is folded with the wheels 12a and 12b proximal to one another.

As seen in FIG. 1, the wheelchair 10 includes a control box 50 which is attached to the frame 14 close to an armrest 52a of the electric wheelchair 10, and which includes a control lever 54, an ON-OFF switch 56, and a speed-power limiting control 58.

Figure 5:
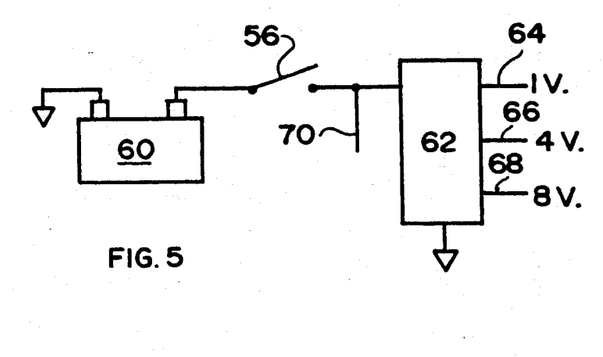
FIG. 5 is a schematic drawing of the source of electrical power, and the regulated voltages, for the systems of FIGS. 9 and 10.

Referring now to FIG. 5, a twelve volt battery, or source of electrical power, 60 is connected to a voltage regulator 62 by the ON-OFF switch 56 of FIG. 1. The voltage regulator 62 includes output conductors 64, 66, and 68 which provide potentials of one, four, and eight volts, respectively, to parts of the circuits of FIGS. 9 and 10 which utilize respective ones of these three different potentials.

Figures 6, 7, 8A, 8B, 8C:
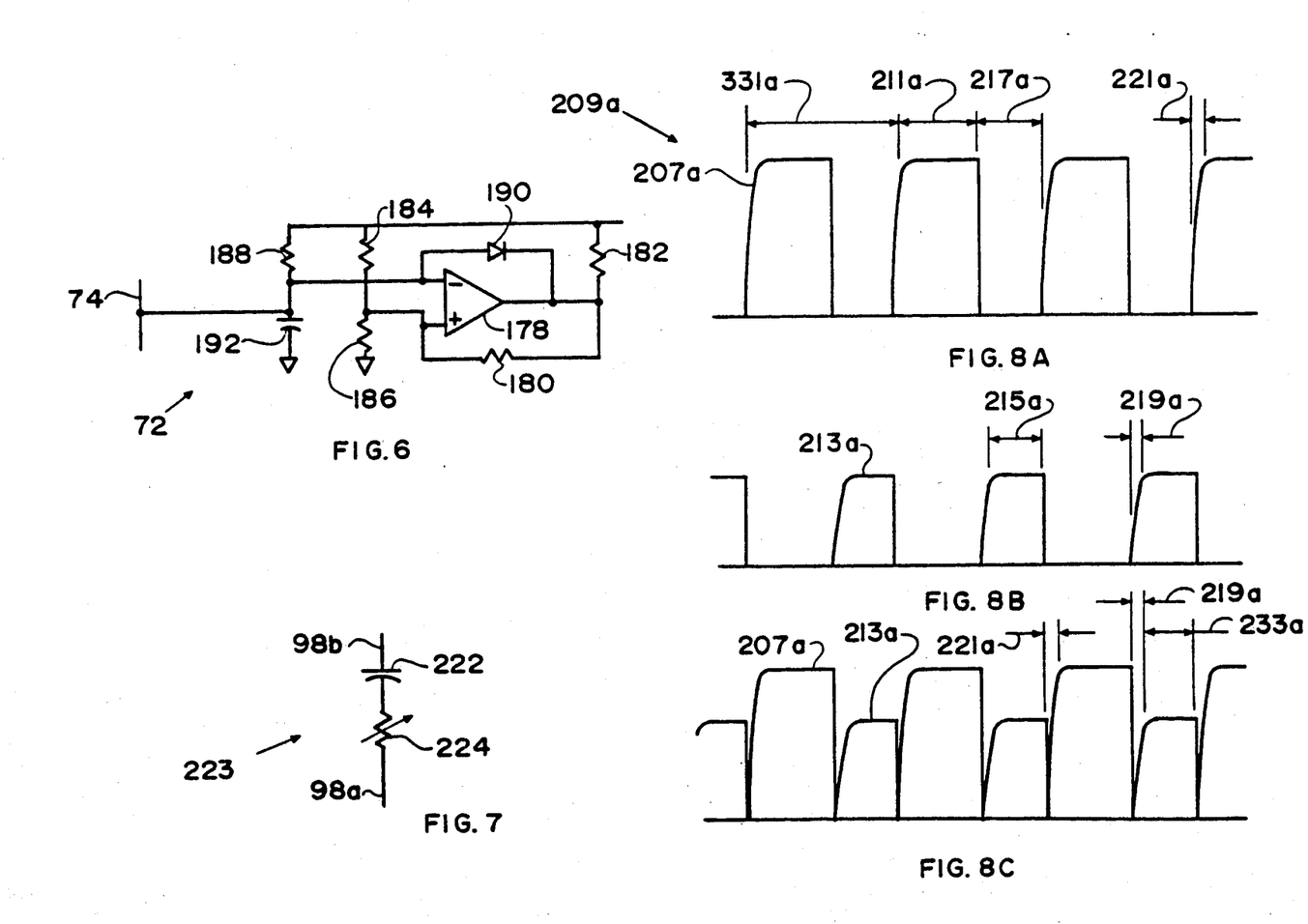
FIG. 6 is a schematic drawing of the sawtooth generator that is a part of pulse-width modulation of the driving voltages for both motors.
FIG. 7 shows the capacitor that limits the difference in change in power that is supplied to the left and right propulsion motors.
FIG. 8A illustrates the wave form of the pulse-width-modulated driving voltage and shows the effective delay at the start of each voltage pulse.
FIG. 8B illustrates the wave form of the dynamic braking pulses and shows the effective delay at the start of each pulse.
FIG. 8C shows the wave forms of FIGS. 8A and 8B superimposed.
Figure 10:
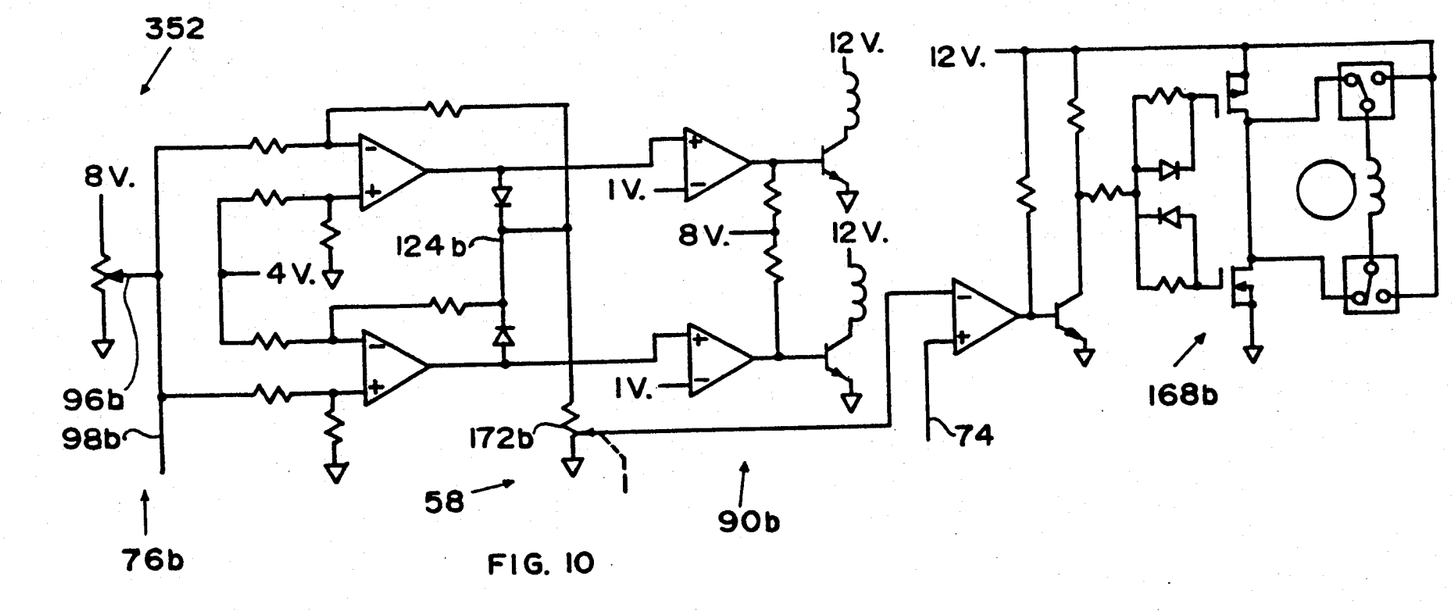
FIG. 10 is a schematic drawing of the motor and electronics for driving the left wheel.

A conductor 70, which is connected to the switch 56 furnishes voltage to parts of the circuits of FIGS. 6 and 10 which indicate a potential of twelve volts.

Figure 9A:
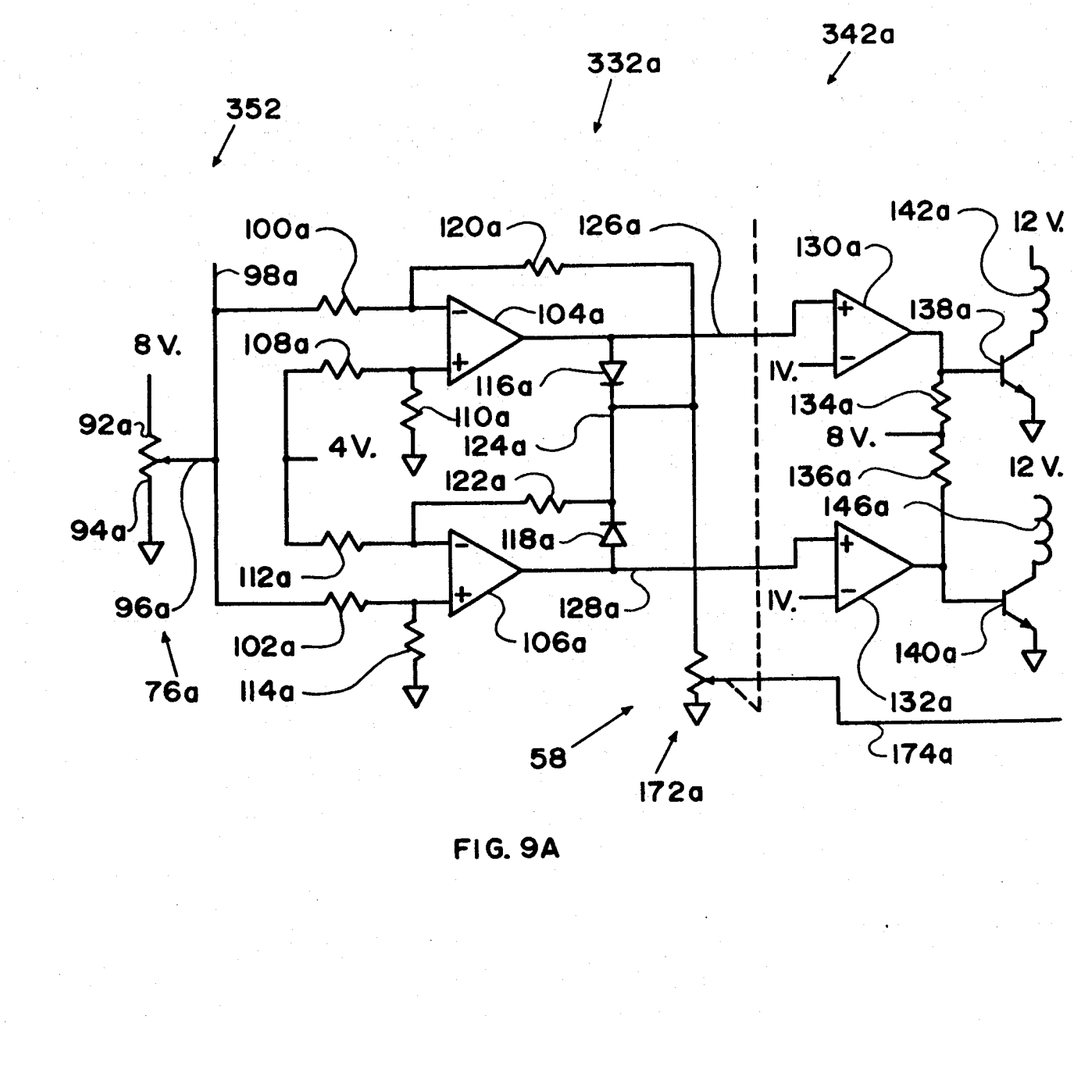
FIGS. 9A and 9B combine to provide a schematic drawing of the motor and electronics for driving the right wheel, and may be considered as combining to form FIG. 9.
Figure 9B:
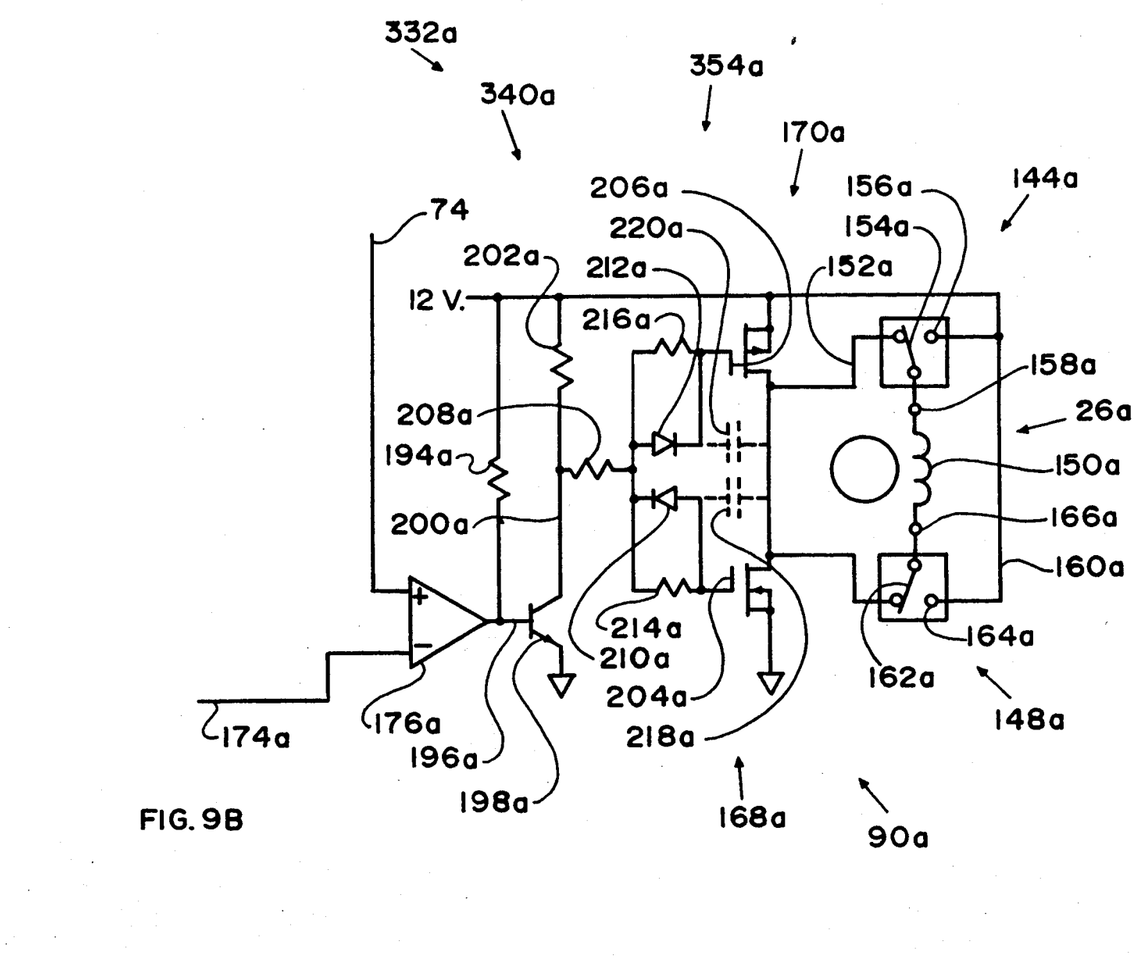

Referring now to FIGS. 9A and 9B, FIGS. 9A and 9B combine to provide a circuitry for the right motor 26a that hereafter will be referred to as FIG. 9.

Referring now to FIGS. 9 and 10, the circuitry of these two figures is the same; and a sawtooth generator 72 of FIG. 6 provides a sawtooth signal in a conductor 74 for use with the circuitry of both FIGS. 9 and 10.

FIG. 9 includes a first potentiometer, or right motor potentiometer, 76a; and FIG. 10 includes a second potentiometer, or left motor potentiometer 76b.

Figure 4:
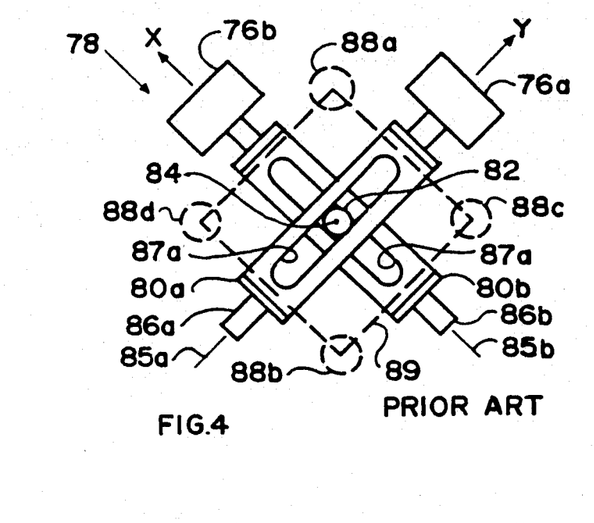
FIG. 4 is a simplified representation of a prior art control lever which provide X and Y axis resistances proportional to movement of the control lever.

An X-Y control, or manual control 78, of one of the types that are commercially available, is shown in pictorial form in FIG. 4. The manual control 78 includes the control lever 54 of FIGS. 1 and 2, the potentiometers 76a and 76b of FIGS. 9 and 10, arcuate levers 80a and 80b, and an actuating lever 82.

In the prior art type of manual control as depicted by FIG. 4, the control lever 54 of FIGS. 1 and 2 is mounted for pivotal movement about a point 84 by the use of a spherical surface, not shown, so that the actuating lever 82 pivots about the point 84 in exactly the opposite direction as the control lever 54, and for distances that are in a fixed relationship to movement of the control lever 54.

The arcuate levers 80a and 80b are mounted for rotation about axes 85a and 85b by shafts 86a and 86b, are coupled to respective ones of the potentiometers 76a and 76b, include actuating slots 87a and 87b which receive the actuating lever 82, and depend semicircularly downward between the shafts 86a and 86b; so that movement of the control lever 54 in X or Y directions, or in any combination thereof, produces a rotational movement of the potentiometer 76a proportional to movement of the control lever 54 in the X direction, and rotational movement of the potentiometer 76b proportional to movement of the control lever 54 in the Y direction.

Moving the control lever 54 to positions 88a–88d, which represent corners of an allowable range of movement indicated by a square 89, results in full forward power for both electric motors, 26a and 26b, when the control lever 54 is positioned at the position 88a, full reverse for both electric motors when the control lever 54 is positioned at the position 88b, a right pivotal turn with the left motor 26b at full forward and the right motor 26a at full reverse when the control lever 54 is in the 88c position, and a left pivotal turn when the control lever 54 is in the 88d position.

Since the circuitry of FIGS. 9 and 10 are identical, only FIG. 9, which includes the circuitry which drives the right electric motor 26a, will be described.

Referring now to FIG. 9, an electric motor drive, or right wheel drive, 90a includes the potentiometer 76a. The potentiometer 76a includes an upper leg 92a that is connected to the conductor 68 of FIG. 5 and receives a potential of eight volts therefrom, a lower leg 94a that is connected to ground, as shown, and a wiper arm 96a.

Movement of the wiper arm 96a above a midpoint in the resistance of the potentiometer 76a produces a right-propulsion signal that increases from four to eight volts in a conductor 98a as the wiper arm 96a moves upwardly from the midpoint in the resistance; and movement of the wiper arm 96a below the midpoint in the resistance of the potentiometer 76a produces a right-propulsion signal that varies from four volts down to zero as the wiper arm 96a moves downwardly from the midpoint.

The right-propulsion signal in the conductor 98a is supplied to an input resistor 100a and to an input resistor 102a. The input resistor 100a is connected to the negative input terminal of an operational amplifier 104a; and the input resistor 102a is connected to the positive input terminal of an operational amplifier 106a.

The positive input terminal of the operational amplifier 104a is connected to four volts by an input resistor 108a and to ground by a resistor 110a; and the negative input terminal of the operational amplifier 106a is connected to four volts by an input resistor 112a and to ground by a resistor 114a.

The output of the operational amplifier 104a is a forward-rotation signal; and the output of the operational amplifier 106b is a reverse-rotation signal.

The outputs of the operational amplifiers 104a and 106a are connected together by means of diodes 116a and 118a; and feedback resistors 120a and 122a are connected to a junction 124a that is intermediate of the diodes 116a and 118a, and to respective ones of the negative input terminals of the operational amplifiers, 104a and 106a.

Continuing to refer to FIG. 9, if the feedback resistor 120a were connected directly to the output terminal of the operational amplifier 104a, rather than between the diodes, 116a and 118a, then a decrease below four volts in the conductor 98a, as produced by the wiper arm 96a moving downwardly from the midpoint of the resistance in the potentiometer 76a, would produce a voltage that would vary from zero to four volts at the output terminal of the operational amplifier 104a.

However, since the feedback resistor 120a is connected between the diodes 116a and 118a, the voltage between the diodes 116a and 118a varies from zero to four volts with movement of the wiper arm 96a from the midpoint of the potentiometer 76a downwardly toward zero volts; and the voltage at the output terminal of the operational amplifier 104a is higher by the voltage drop across the diode 116a, which is approximately six-tenths of a volt.

In like manner, with an increase in voltage in the conductor 98a from four volts to eight volts, as the wiper arm 96a is moved upwardly toward eight volts, the operational amplifier 106a produces a voltage that increases from zero to four volts at the junction 124a, and that is approximately six-tenths of a volt higher at the output of the operational amplifier 106a.

The operational amplifiers 104a and 106a cooperate with the diodes 116a and 118a to form an absolute value circuit. That is, whether the wiper arm 96a of the potentiometer 76a moves upwardly above the midpoint of the resistance thereof, or moves downwardly below the midpoint of the resistance thereof, a power-control signal is produced at the junction 124a which increases as a function of the wiper arm 96a of the potentiometer 76a moving away from the midpoint of the resistance thereof. The use of this power-control signal will be described subsequently.

The circuitry described thus far produces three control signals: the operational amplifier 104a produces a forward-rotation signal in a conductor 126a; the operational amplifier 106a produces a reverse-rotation signal in a conductor 128a; and the diodes 116a and 118a cooperate with the forward-rotation signal in the conductor 126a and with the reverse-rotation signal of the conductor 128a to provide the power-control signal at the junction 124a.

The forward-rotation signal is supplied to the positive input terminal of a comparator 130a; and the reverse-rotation signal is supplied to the positive input terminal of a comparator 132a. Both of the comparators, 130a and 132a, are connected to the one volt source of FIG. 5; so that both comparators, 130a and 132a, have a threshold of approximately one volt.

Continuing to refer to FIG. 9, since the outputs of the operational amplifiers, 104a and 106a have outputs that are approximately zero volts when the wiper arm 96a is at the midpoint of the resistance of the potentiometer 76a, neither will have sufficient voltage to produce an output from the respective one of the comparators, 130a or 132a.

When the signal voltage in the conductor 98a is a few tenths of a volt below the four volt input to the positive input resistors of the operational amplifier 104a, the output of the operational amplifier 104a will exceed the one volt threshold of the comparator 130a; and when the signal voltage in the conductor 98a is a few tenths of a volt above the four volt input to the negative input resistors of the operational amplifier 106a, the output of the operational amplifier 106a will exceed the one volt threshold of the comparator 132a.

Thus, it is theoretically impossible for the comparators, 130a and 132a, to produce outputs signalling both forward and reverse rotation of the electric motor 26a for any position of the wiper arm 96a. Instead, the wiper arm 96a must be offset four-tenths of a volt on either side of the four volt mid-point to produce a signal that initiates rotation of the electric motor 26a in either the forward or reverse direction.

The output terminals of the comparators 130a and 132a are connected to the eight volt conductor 68 of FIG. 5 by pull-up resistors 134a and 136a respectively, and to forward-power transistor 138a and reverse power-transistor 140a, respectively.

The forward-power transistor 138a is connected to ground, and to twelve volts through a relay coil 142a of a forward-power relay 144a; and the reverse-power transistor 140a is connected to ground, and to twelve volts through a relay coil 146a of a reverse-power relay 148a.

The right electric motor 26a includes a motor winding 150a which is connected to the relays, 144a and 148a, as shown; and the relays, 144a and 148a, are in their unenergized positions, as shown; so that the motor winding 150a is shorted by the relays, 144a and 148a, and by conductors 152a.

Thus, when neither of the relay coils, 142a or 146a, is energized, the system shorts the motor winding 150a, thereby causing the electric motor 26a to function as an electrically loaded generator, and thereby providing dynamic braking.

This condition of dynamic braking occurs in three different modes. It occurs when the manually selected position of the control lever 54 of FIGS. 1 and 2 is such that neither relay coil, 142a or 146a, is energized; it occurs when the switch 56 of FIG. 5 is in the OFF position, as shown; and it occurs when the battery 60 is removed from the circuit.

Thus, the system provides power-off dynamic braking as well as providing dynamic braking during power-on conditions.

When the comparator 130a provides an output, the transistor 138a energizes the relay coil 142a, and a relay contactor 154a is moved to a contact 156a, thereby connecting an end 158a of the motor winding 150a to a twelve volt conductor 160a.

In like manner, when the relay coil 146a is energized, a relay contactor 162a is moved to a contact 164a, connecting an end 166a of the motor winding 150a to the twelve volt conductor 160a.

Thus the relays 144a and 148a function to determine which of the ends, 158a or 166a, of the motor winding 150a are connected to the twelve volt conductor 160a, function to determine the polarity of the power being supplied to the electric motor 26a, and thereby determine the direction of rotation of the electric motor 26a.

However, completion of the circuitry to supply power to the electric motor 26a is dependent upon a field-effect transistor, or FET 168a. The functioning of the field-effect transistor 168a, and another field-effect transistor, or FET, 170a, will be described subsequently.

Continuing to refer to FIG. 9, it was shown previously that a power-control signal is developed at the junction 124a, whereas direction-control signals are developed in the conductors 126a and 128a.

The power control signal of junction 124a is connected to a potentiometer 172a with is mechanically connected to a potentiometer 172b of FIG. 10. The potentiometers 172a and 172b serve to attenuate the power-control signals of the junctions 124a of FIG. 9 and 124b of FIG. 10, and thus to provide an adjustable means for limiting the maximum power supplied to the electric motors 26a and 26b.

The attenuated power-control signal in a conductor 174a is supplied to the negative terminal of a comparator 176a; and the positive terminal of the comparator 176a is connected to the sawtooth generator 72 by the conductor 74.

Referring now to FIG. 6, the sawtooth generator 72 includes an operational amplifier 178, resistors 180, 182, 184, 186, and 188, a diode 190, and a capacitor 192. The sawtooth generator 72 is a standard relaxation circuit and a detailed description can be found in both electronic textbooks and handbooks. Thus, it is sufficient to note that a sawtooth voltage is delivered to the conductor 74 that varies from a minimum of one volt to a maximum of three volts.

Referring again to FIG. 9, the comparator 176a, together with a pull-up resistor 194a which is connected between the output of the comparator 176a and the twelve volt conductor 160a, produces an output in a conductor 196a whenever the input to the negative terminal of the comparator 176a is greater than the sawtooth voltage which the sawtooth generator 72 supplies to the positive input terminal of the comparator 176a via the conductor 74.

The result is that a pulse-width-modulated control signal is produced in the conductor 196a whose pulse widths are a function of the magnitude of the attenuated power-control signal in the conductor 174a.

The conductor 196a is connected to a transistor 198a. The transistor 198a is connected to the twelve volt source in the conductor 160a by a conductor 200a and a pull-up resistor 202a, and is connected to ground.

The field-effect transistor 168a is an N channel enhancement mode MOSFET which turns on when its gate 204a is increased above ground potential; and the field-effect transistor 170a is a P channel enhancement mode MOSFET which turns on when its gate 206a is decreased below its source potential.

When the output of the comparator 176a is producing a voltage pulse, the gate 204a of the FET 168a is above ground potential; and the FET 168a completes the circuitry of the electric motor 26a by connecting one of the ends, 158a or 166a, of the motor winding 150a to ground.

Of course, the one of the ends, 158a or 166a, that is connected to ground by the FET 168a depends upon the positions of the relay contactors 154a and 162a of the relays 144a and 148a.

But when the comparator 176a is not producing an output in the conductor 196a, as is the condition between pulses of the pulse-width-modulated control voltage, then the voltage in the conductor 196a is approximately 0.7 volts and current flow in the pull-up resistor 202a, and the voltage drop thereof, brings the voltage on the gate 206a of the FET 170a down below the source voltage of the twelve volt conductor 160a.

With the voltage on the gate 206a below the source voltage, the FET 170a conducts, connecting the twelve volt conductor 160a to the conductors 152a. Since one of the ends, 158a or 166a, of the motor winding 150 is connected to the twelve volt conductor 160a by one of the relay contactors, 154a or 162a, the result is that both ends, 158a and 166a, of the motor winding 150a are connected to the twelve volt conductor 160a; the motor winding 150a is shorted; the electric motor 26a functions as an electrically loaded generator; and the electric motor 26a provides dynamic braking.

Referring now to FIGS. 8A, 8B, 8C, and 9, the FET 168a pulses a connection to ground so that driving-voltage pulses, or power pulses, 207a of the supply voltage are applied to the electric motor 26a that are an effective driving voltage, or pulse-width-modulated driving voltage, 209a whose pulse widths 211a are generally proportional to manual positioning of the control lever 54 and the potentiometer 76a.

The FET 170a provides dynamic braking pulses 213a whose pulse widths 215a are generally equal to no-power intervals, or no-voltage intervals, 217a between adjacent ones of the power pulses 207a that are supplied by the FET 168a.

When the pulse widths 207a of the driving voltage 209a become wider, the no-power intervals 217a between pulses become smaller, and the dynamic braking is reduced; and as the pulse widths 207a of the driving voltage 209a become narrower, the no-power intervals 217a between the voltage pulses 209a become wider, and the dynamic braking is increased.

Therefore, the dynamic braking has little effect on the efficiency of the drive when the electric motor 26a is operating at, or near, maximum power. But the dynamic braking is quite effective in providing the deceleration that is needed to provide controllability, particularly the deceleration that is required to make turns with a conveyance which is propelled by two electric motors that separately and variably control left and right wheels.

Continuing to refer to FIG. 9, it has been shown that both the FET 168a and the FET 170a are controlled by the voltage in the conductor 196a. Remember that the FET 168a applies power to the electric motor 26a, and the FET 170a shorts the motor winding 150a; so it is apparent that the FETS, 168a and 170a, control functions that must not occur at the same time.

The present invention includes means for providing an effective delay 219a in starting each braking pulse 213a subsequent to the end of respective ones of the power pulses 207a.

Also, the present invention includes means for providing an effective delay 221a in starting each power pulse 207a subsequent to the end of respective ones of the braking pulses 213a.

The means for providing the effective delays, 219a and 221a, include a coupling resistor 208a, diodes 210a and 212a, time-delay resistors 214a and 216a, and parasitic capacitors, 218a and 220a, of the FETS, 168a and 170a, which are indicated by dash-lines.

The output of the transistor 198a is delivered to the gate 204a of the FET 168a by means of the coupling resistor 208a and the time-delay resistor 214a. Now any transistor that has appreciable current-carrying capacity has some parasitic capacitance, as indicated by the parasitic capacitors 218a and 220a. So, an increase in voltage at the gate 204a, in response to an increase in voltage in the conductor 200a at the output of the transistor 198a, is delayed by current flowing through the time-delay resistor 214a to charge the parasitic capacitor 218a.

However, when the voltage falls at the output of the transistor 198a, the parasitic capacitor 218a is discharged rapidly through the diode 210a which bypasses the time-delay resistor 214a.

Thus, the time-delay resistor 214a, the parasitic capacitor 218a and the diode 210a cooperate to provide the effective delay 221a in the start of a pulse 207a of driving voltage 209a; and these same elements cooperate to promptly shut off the FET 168a.

In like manner, the output of the transistor 198a is delivered to the gate 206a of the FET 170a by means the coupling resistor 208a and the time-delay resistor 216a.

When the output of the transistor 198a decreases, a decrease in the voltage at the gate 206a, below the supply voltage in the conductor 160a, is delayed by current flowing through the time-delay resistor 216a as the parasitic capacitor 220a of the FET 170a discharges.

However, when the voltage increases at the output of the transistor 198a, the parasitic capacitor 220a is charged rapidly through the diode 212a which bypasses the time-delay resistor 216a.

Thus, the time-delay resistor 216a, the parasitic capacitor 220a, and the diode 212a cooperate to delay a decrease in voltage on the gate 206a, and to provide the effective delay 219a in each dynamic braking pulse 213a subsequent to cessation of a power pulse 207a; and these same elements cooperate to promptly increase the voltage on the gate 206a, and promptly shut off the FET 170a.

So, means if provided for effectively delaying the start of shorting the motor winding 150a, and for delaying the start of the next power pulse 207a, thereby preventing the motor winding 150a from being shorted during the time that a pulse 207a of the driving voltage 209a is being supplied to the motor winding 150a.

Referring now to FIGS. 7, 9, and 10, the wiper arms 96a and 96b of the potentiometers 76a and 76b are connected together by the conductors 98a and 98b, a time-averaging capacitor 222, and a variable resistor 224.

When the control lever 54 is positioned to make a sudden change in the position of one of the wiper arms, 96a or 96b, with respect to former positions of the wiper arms, 96a and 96b, the capacitor 222 delays the change in voltage in the conductor 98a or 98b that is connected to the one of the wiper arms, 96a or 96b, that has been repositioned abruptly.

Thus, the capacitor 222 time-averages changes in the differences of the signal supply voltages that are being supplied by the potentiometers 76a and 76b; and the capacitor 222 functions as a change limiting means 223 for limiting the rate of change in the difference in power that can be supplied to one motor, 26a or 26b, with respect to the other motor 26b or 26a.

The variable resistor 224 is an optional part of the change limiting means 223; but can be used to provide a means for selectively varying the rate of change in the difference in power that can be supplied to one motor, 26a or 26b, with respect to the other motor, 26b or 26a. While it would be possible to vary the conductance, as represented by the capacitor 222, particularly by switching various capacitors in between the conductors, 98a and 98b, the variable resistor 224 provides a means for infinitely varying the limiting of the rate of change in the signal supply voltages.

Figure 11:
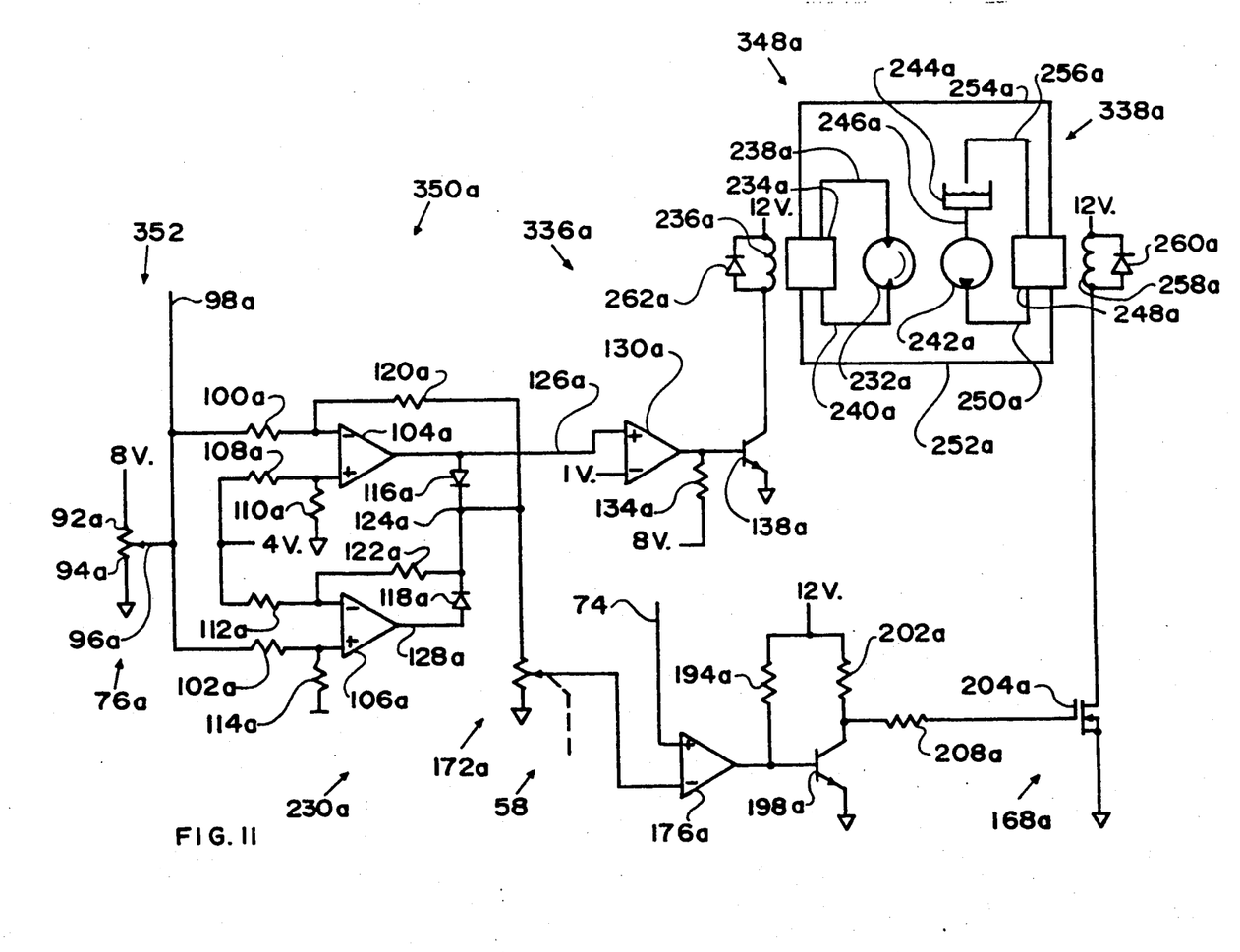
FIG. 11 is a schematic diagram showing a variation of the embodiment of FIGS. 6-9 in which the electronic control, and the differential control limiting thereof, is used to control hydraulic motors.

Referring now to FIG. 11, a fluid motor drive 230a is similar to the electric motor drive 90a of FIG. 9, is used to control a reversible fluid motor 232a, and achieves limiting of the rate of change in the difference in the speed of the fluid motors 232a, and a similar fluid motor, not shown, similar to that which has been described for the electric motors 26a and 26b.

The fluid motor drive 230a is used in cooperation with another fluid motor drive, not shown. Both of the fluid motor drives, 230a and the other fluid motor drive, are used with the sawtooth generator 72 of FIG. 6, are connected thereto by the conductor 74, and cooperate with the sawtooth generator to separately provide, and to separately utilize, pulse-width-modulated control voltages.

In like manner, the fluid motor drives, 230a, and not shown, are connected together by the change limiting means 223 of FIG. 7.

The fluid motor drive 230a includes a directional control valve 234a with a solenoid coil 236a, the fluid motor 232a which is connected to the directional control valve 234a by motor conduits 238a and 240a, a fluid pump 242a which is connected to a fluid reservoir 244a by an inlet conduit 246a and to a proportional output valve 248a by an outlet conduit 250a.

The fluid pump 242a and the fluid reservoir 244a provide a source of fluid power, the fluid power is delivered to the proportional output valve 248a by the outlet conduit 250a, the proportional output valve 248a delivers pressurized fluid to the directional control valve 234a by a supply conduit 252a, the directional control valve 234a delivers the pressurized fluid to the fluid motor 232a through one of the motor conduits 238a or 240a, the fluid motor 232a returns fluid to the directional control valve 234a through the other of the motor conduits, 240a or 238a, the directional control valve 234a returns fluid to the proportional output valve 248a through a return conduit 254a, and the proportional output valve 248a returns fluid to the fluid reservoir 244a through a reservoir conduit 256a.

Positioning the potentiometer 76a produces an output from the transistor 138a as described in conjunction with FIG. 9.

The transistor 138a connects the solenoid coil 236a between twelve volts and ground whenever the potentiometer 76a is positioned to develop a voltage in the conductor 98a that is less than four volts.

The directional control valve 234a is positioned to supply pressurized fluid to one of the motor conduits, 238a or 240a, when the solenoid coil 236a is energized, and is positioned to supply pressurized fluid to the other of the motor conduits, 240a or 238a, when the solenoid coil 236a is not energized. Therefore, only one comparator, 130a, is needed, whereas two comparators, 130a and 132a, were used with the electric motor drive 90a of FIG. 9.

The proportional output valve 248a includes a solenoid coil 258a which controls the flow rate of pressurized fluid that is delivered to the directional control valve 234a proportional to the effective driving voltage that is applied across the solenoid coil 258a. Or, alternately, the proportional output valve controls the flow of fluid coming back from the fluid motor 232a.

As described in conjunction with FIG. 9, a pulse-width-modulated control signal is developed at the output of the comparator 176a as the sawtooth output of the sawtooth generator 72 is compared with the attenuated voltage out of the potentiometer 172a. This pulse-width-modulated control signal cooperates with the FET 168a to provide a pulse-width-modulated voltage as has been described in conjunction with FIG. 9; and this pulsed voltage is applied to the solenoid coil 258a of the proportional output valve 248a to provide a fluid flow rate that is proportional to positioning of the potentiometer 76a.

The fluid motor drive 230a includes a diode 260a which is connected across the solenoid coil 258a of the proportional output valve 248a, and which prevents excessive voltages from being applied to the output of the FET 168a when the magnetic field of the solenoid coil 258a collapses. In like manner, a diode 262a is placed across the solenoid coil 236a of the directional control valve 234a to prevent excessive voltages from being applied to the output of the transistor 138a when the magnetic field of the solenoid coil 236a collapses.

The electronic circuitry of the embodiment of FIG. 11 does not include dynamic braking; so the circuitry of FIG. 9 that includes the FET 170a is not needed. Consequently, time delays between pulses of driving voltage and pulses of braking voltage are not needed. So, only one FET, 168a, is required; and the time-delay resistor 214a and the diode 210a of FIG. 9 are not needed. Thus, in FIG. 11 the coupling resistor 208a is connected directly to the gate 204a of the FET 168a.

Hydraulic circuits and components for achieving control of fluid motors, including the direction of rotation, rotational speed, and dynamic braking are common to the art; so the hydraulic circuitry of FIG. 11 is representative of one of the many ways in which the control of direction of rotation, speed of rotation, and limitation of the rate of change of two fluid motors can be achieved with the present invention.

Figure 12:
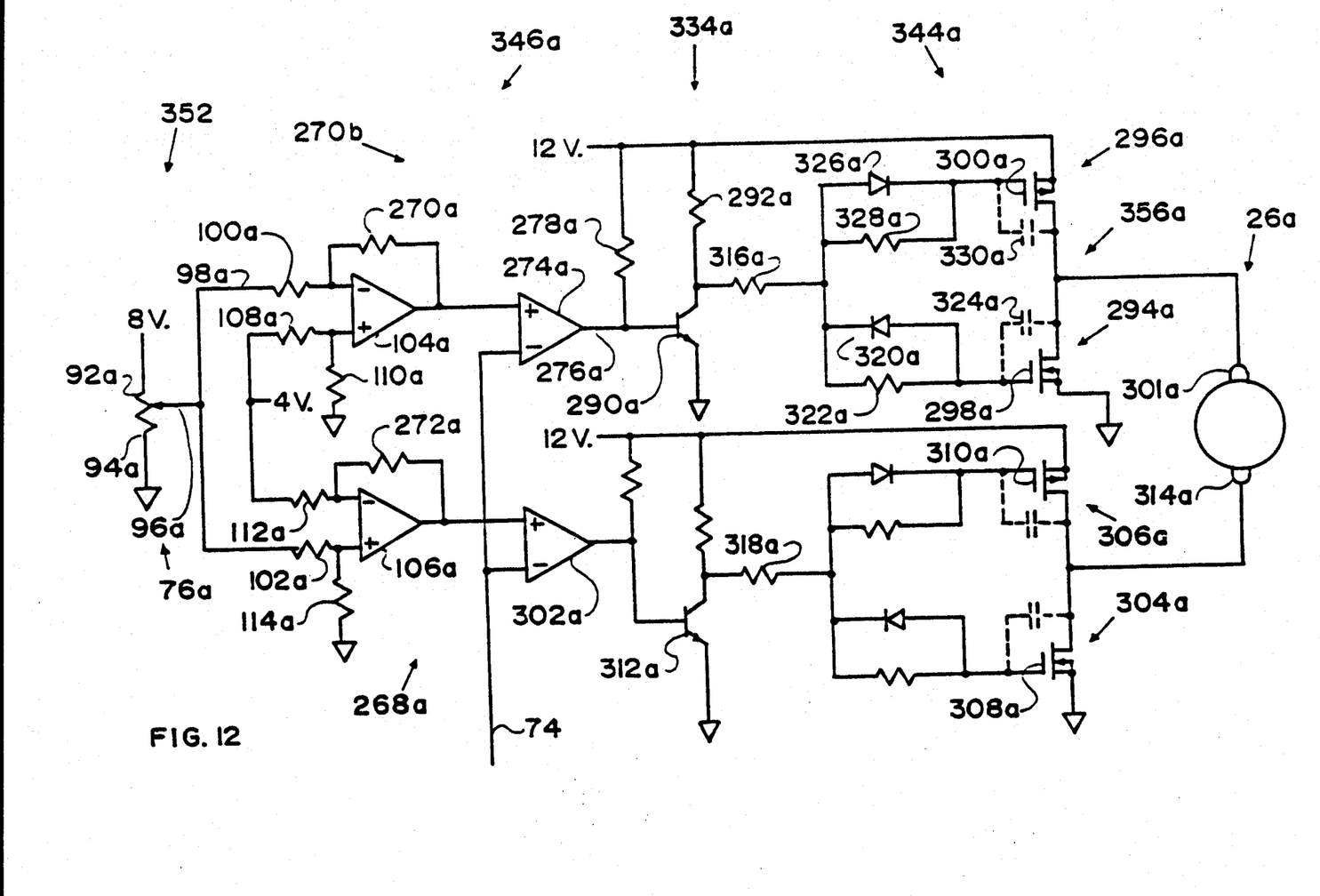
FIG. 12 is a schematic drawing showing a variation of the FIGS. 9 and 10 embodiment in which field-effect transistors are used to control both the polarity of the power and the application of the pulses, thereby eliminating the need for mechanical relays.

Referring now to FIG. 12, an electric motor drive 268a is provided which is similar to the electric motor drive 90a of FIG. 9, but which has the advantage of eliminating the mechanical relays, 144a and 148a, of FIG. 9.

The electric motor drive 268a cooperates with an identical electric motor drive, not shown, with the sawtooth generator 72 of FIG. 6, and with the change limiting means 223 FIG. 7 for limiting the rate of change in the difference of power supplied to two electric motors, as described in conjunction with FIG. 9.

The electric motor drive 268a of FIG. 12 includes the operational amplifiers 104a and 106a of FIG. 9. The operational amplifiers 104a and 106a are connected to the potentiometer 76a, to the four volt source, and to ground by identically numbered and identically named parts as those of FIG. 9. The embodiment of FIG. 12 uses feedback resistors 270a and 272a to feed back the outputs of the amplifiers, 104a and 106a, to their respective inputs.

When the control lever 54 of FIGS. 1 and 2 is in its centered position, the wiper arm 96a of the potentiometer 76a is at the midpoint of the resistance, and the wiper arm 96a delivers four volts to the inputs of both of the operational amplifiers, 104a and 106a.

Since the amplifiers, 104a and 106a are differential amplifiers with four volts on both inputs, the outputs of both amplifiers, 104a and 106a, are at ground potential when the wiper arm 96a supplies four volts to both operational amplifiers, 104a and 106a.

As the wiper arm 96a is moved downwardly, the output of the amplifier 104a increases above ground potential; and as the wiper arm 96a is moved upwardly, the output of the amplifier 106a increases above ground potential. Notice that the amplifiers, 104a and 106a, cannot produce outputs simultaneously.

If, for instance, the amplifier 104a is producing an output, this output is compared to the sawtooth waveform of the sawtooth generator 72 by a comparator 274a and a pulse-width-modulated control signal is developed in a conductor 276a by the comparator 274a and a pull-up resistor 278a that is connected between the conductor 276a and the twelve volt source.

The pulse-width-modulated control signal is delivered to a transistor 290a by the conductor 276a. The pulse-width-modulated control signal is inverted and the level of the signal is shifted by the transistor 290a and by a pull-up resistor 292a which is connected between the transistor 290a and the twelve volt source.

The output of the transistor 290a is connected to FETS 294a and 296a. The FET 294a is an N channel enhancement mode MOSFET which turns on when its gate 298a is increased above ground potential; and the FET 296a is a P channel enhancement mode MOSFET which turns on when its gate 300a is decreased below its source potential.

When the wiper arm 96a of the potentiometer 76a is below the mid-point of the resistance, and the voltage on the wiper arm 96a is less than four volts, the output of the comparator 274a is high during the pulse which is developed by the comparator 274a, the output of the transistor 290a is low, the voltage to the gate 300a of the FET 296a is below the source voltage, the FET 296a is on, and a terminal 301a of the motor 26a is connected to the twelve volt source by the FET 296a.

In like manner, the output of a comparator 302a is connected to FETS 304a and 306a. THE FET 304a is an N channel enhancement mode MOSFET which turns on when its gate 308a is increased above ground potential; and the FET 306a is a P channel enhancement mode MOSFET which turns on when its gate 310a is decreased below its source potential.

Continuing the description of operation with the wiper arm 96a of the potentiometer 76a below the mid-point in its resistance, in this condition, there is no output from the comparator 302a, the output of a transistor 312a is high, the voltage to the gate 310a of the FET 306a is high, the FET 306a is off, the gate 308a of the FET 304a is high, the FET 304a is on, and the FET 304a connects a terminal 314a of the electric motor 26a to ground.

Thus, in the condition described, the FETS 296a and 304a cooperate to determine the direction of rotation of the electric motor 26a by making connections respectively to the terminals 301a and 314a of the electric motor 26a; and the FET 296a connects the electric motor to the twelve volt source with pulse widths that are proportional to the positioning of the wiper arm 96a below the mid-point of the potentiometer 76a to provide a pulse-width-modulated driving voltage.

Continuing to describe the operation of the FIG. 12 embodiment, with a voltage on the wiper arm 96a that is less than four volts, the comparator 274a is supplying pulses of voltage that are pulse-width-modulated. However, between voltage pulses of the comparator 274a, the output of the comparator 274a is low, the output of the transistor 290a is high, the gate 300a of the FET 296a is at source voltage, the FET 296a is off, the gate 298a of the FET 294a is high, the FET 294a is on, and the FET 294a is connecting the terminal 301a of the electric motor 26a to ground.

So, between voltage pulses of the comparator 274a, the terminal 301a of the electric motor 26a is connected to ground by the FET 294a and the terminal 314a of the electric motor 26a is connected to ground by the FET 304a.

Therefore, the circuitry that has been described provides dynamic braking between pulses of the pulse-width-driving voltage by shorting the electric motor 26a, and thereby causing the electric motor 26a to function as an electrically loaded generator.

Operation of the circuitry with a voltage of more than four volts on the wiper arm 96a functions in like manner as has been described for voltages of less than four volts on the wiper arm 96a, the difference being that the comparator 302a cooperates with the FETS 306a and 304a to provide connections that determine the direction of rotation of the electric motor 26a, that pulse the power, and that provide dynamic braking, and the circuitry to ground is completed by the FET 294a.

The output of the transistor 290a is coupled to the FETS 294a and 296a by circuitry that includes a coupling resistor 316a; and the output of the transistor 312a is coupled to the FETS 304a and 306a by circuitry that includes a coupling resistor 318a.

An increase in voltage at the gate 298a of the FET 294a, and a delay in turning on the FET 294a, is achieved by a diode 320a, a time-delay resistor 322a, and a parasitic capacitor 324a which is inherent in the design of the FET 294a, in the manner that has been described in conjunction with FIG. 9.

In like manner, a decrease in voltage at the gate 300a of the FET 296a below the source voltage, and a delay in turning on the FET 296a, is achieved by a diode 326a, a time-delay resistor 328a, and a parasitic capacitor 330a which is inherent in the design of the FET 296a.

The construction thus described provides a time-interval between the cessation of one voltage pulse of the pulse-width-modulated driving voltage and an adjacent one of the dynamic braking pulses, and a time-interval between the end of one braking pulse and the start of the next voltage pulse.

Thus, it can be seen that the electric motor drive of FIG. 12 provides the same advantages as the electric motor drive 90a of FIG. 9, and also eliminates the necessity of using mechanical relays, such as the relays 144a and 148a.

Referring again to FIGS. 8A, 8B, and 8C, the power pulses 207a are at an amplitude of the source voltage, which preferably is either 12 or 24 volts. The frequency of the sawtooth which is generated by the sawtooth generator 72 is preferably 125 hertz; so a period 331a of the driving voltage is preferably 0.008 seconds.

In a typical design the effective delays, 219a and 221a, are approximately 200 microseconds; and the amplitude of the braking pulses 213a is about one volt.

The braking pulse 213a is applied for a portion 233a of the no-power interval 217a; and the portion 233a is less than the no-power interval 217a by the effective delay 219a of the brake pulse 213a.

For purposes of understanding the appended claims, a first electric embodiment of the invention includes a motor control 332a which includes all of the components of the motor drive 90a FIG. 9 except for the potentiometer 76a and 76b and the electric motor 26a, and includes the sawtooth generator 72 of FIG. 6.

A second electric embodiment includes a motor control 334a includes the sawtooth generator 72 of FIG. 6, and includes all of the components of the motor drive 268a of FIG. 12 except for the potentiometer 76a and the electric motor 26a.

In the hydraulic embodiment, a motor control 336a includes the sawtooth generator 72 of FIG. 6, and includes all of the components of the motor drive 230a of FIG. 11 except for the potentiometer 76a and the fluid motor 232a.

While the motors 26a and 232a have been shown as rotary motors, it will be apparent that the present invention will provide differential control limiting for changes in linear velocity of linear motors as well. Therefore, the word "motor" is to be construed in its broader sense of an actuator which is either rotary or linear.

The hydraulic embodiment of FIG. 11 includes a source of fluid power 338a which includes the pump 242a and the reservoir 244a.

The motor control 332a of FIGS. 6 and 9 includes both a power control, or driving voltage control, 340a and an electronic control 342a. The power control 340a includes the transistors 138a and 140a, the transistor 198a, the FET 168a, and the relays 144a and 148a.

The electronic control 342a of FIGS. 6 and 9 includes the amplifiers 104a and 104b, the comparators 130a and 130b, the potentiometer 172a, the comparator 176a, and the sawtooth generator 72.

The motor control 334a of FIGS. 6 and 12 includes both a power control, or driving voltage control, 344a and an electronic control 346a.

In like manner the motor control 336a of FIGS. 6 and 11 includes both a power control 348a and electronic control 350a.

The power control 344a of FIG. 12 includes the transistors 290a and 312a and the FETS 296a and 304a; and the power control 348a of FIG. 11 includes the transistor 138a, the transistor 140a, the FET 168a, the directional control valve 234a, and the proportional output valve 248a.

A manual control 352, includes the potentiometers 76a and 76b, the control lever 54, and any mechanism that interconnects the control lever 54 to the potentiometers 76a and 76b, such as the prior art mechanism of FIG. 4.

The embodiment of FIG. 9 includes a motor loading means 354a which includes the FET 170a and the embodiment of FIG. 12 includes a motor loading means 356a which includes the FET 294.

The sawtooth generator 72 of FIG. 6 cooperates with the comparator 176a of FIG. 9 to provide a pulse-width modulator. In like manner the sawtooth generator 72 cooperates with the comparator 274a of FIG. 12 to provide a pulse-width modulator.

In summary, the present invention provides apparatus and method for providing a conveyance, a motor drive, and a control, in which: dynamic braking is provided by shorting the motor winding during a portion of the interval between power pulses; differential control limiting is provided that assures ease and accuracy of manual control by limiting the rate of change in the difference of power that can be supplied to one motor with respect to the other motor; power-off braking is achieved by shorting the motor winding when no power pulses are being supplied to the motors; extended relay life is achieved by transmitting power to the motors only when the relay contacts are closed; and a solid-state switching device is provided that is controlled by a signal in a single conductor and that provides an effective delay in switching.

Differential control limiting is applicable to both electric and fluid motors; dynamic braking is applicable to any electric motor that can function as an electrically loaded generator and that is driven by voltage pulses whether width-modulated, amplitude-modulated, or unmodulated; power-off braking is applicable to various uses, particularly with reversing motors; and the circuitry for increasing relay life is particularly applicable to reversible electric motors.

While specific apparatus and parameters have been disclosed in the preceding description, and while numbers of specific parts that have been described in the specification have been included in the claims, it should be understood that these specifics have been given for the purpose of disclosing the principles of the present invention and that many variations thereof will become apparent to those who are versed in the art. Therefore, the scope of the present invention is to be determined by the appended claims and the recitations thereof.

INDUSTRIAL APPLICABILITY

The present invention is applicable to conveyances in which left and right traction elements are separately and variably controlled by left and right electric or fluid motors, is applicable to conveyances in which the operator has hand tremors, and is applicable to conveyances in which dynamic braking of electric motors is needed.

What is claimed is:

1. A conveyance (10) having first (12a) and second (12b) propulsion elements, and having first (26a or 232a) and second (26b, etc.) motors that are operatively connected to said first and second propulsion elements, the improvement which comprises:

motor control means (332a, 334a, or 336a), being connected to said first and second motors and to a source (60) of power, for separately and variably supplying power to said first and second motors;

manual control means (352), being operatively connected to said motor control means, for selectively and variably controlling said motor control means; and change limiting means (223), being operatively connected to said motor control means, for limiting the rate of change in differences in power supplied to said first and second motors, while permitting larger rates of change in power supplied to said motors when rates of changes in power supplied to said first and second motors are generally equal.

2. A conveyance (10) as claimed in claim 1 in which said change limiting means comprises means (224) for adjusting said limiting of said rate of change in differences in power.

3. A conveyance (10) as claimed in claim 1 in which said connection of said manual control means (352) to said motor control means (332a, 334a, or 336a) comprises first (98a) and second (98b) control signal conductors;

said manual control means (352) includes means (76a and 76b) for producing first and second control signals in respective ones of said first and second control signal conductors; and said means for limiting the rate of change in differences in power supplied to said motors (26a, 232a, 26b, etc.) includes means (224) for limiting the rate of change in the difference in said control signals.

4. A conveyance (10) as claimed in claim 1 in which said connection of said manual control means (352) to said motor control means (332a, 334a, or 336a) comprises first (98a) and second (98b) control signal conductors;

said manual control means (352) includes means (76a and 76b) for producing first and second control signals in respective ones of said first and second control signal conductors; and said change limiting means (223) includes means, comprising a capacitor (222), for limiting the rate of change in the difference of said control signals.

5. A conveyance (10) as claimed in claim 1 in which said connection of said manual control means (352) to said motor control means (332a, 334a, or 336a) comprises first (98a) and second (98b) control signal conductors;

said manual control means includes means (76a and 76b) for producing first and second control signals in respective ones of said first and second control signal conductors; and said change limiting means (223) includes means, comprising a capacitor (222), for comprising means (224) for limiting current flow into said capacitor, for limiting the rate of change in the difference of said control signals.

6. A conveyance (10) as claimed in claim 1 in which said connection of said manual control means (352) to said motor control means (332a, 334a, or 336a) comprises first (98a) and second (98b) control signal conductors;

said manual control means includes means (76a and 76b) for producing first and second control signals in respective ones of said first (98a) and second (98b) control signal conductors; and said change limiting means (223) includes means, comprising a capacitor (222), and comprising adjustable means (224) for selectively limiting current flow into said capacitor, for adjustably limiting the rate of change in the difference of said control signals.

7. A conveyance (10) as claimed in claim 1 in which said first and second motors comprise a fluid motor (232a);

said source of power comprises a source (338a) of fluid power; and said supplying of power to said motors comprises supplying fluid power to said fluid motor.

8. A conveyance (10) as claimed in claim 1 in which said first and second motors comprise first (26a) and second (26b) electric motors;

said source of power comprises a source (60) of electrical power; and said supplying of power to said motors comprises supplying electrical power to said electric motors.

9. A conveyance (10) as claimed in claim 1 in which said first and second motors comprise first (26a) and second (26b) electric motors;

said source of power comprises a source (60) of electrical power; and said supplying of power to said motors comprises supplying pulses (207a) of electrical power supplied to said electric motors that are interspersed with intervals (217a) of no power.

10. A conveyance (10) as claimed in claim 1 in which said first (26a) and second (26b) motors comprise first (26a) and second (26b) electric motors;

said source of power comprises a source (60) of electrical power;

said supplying of power to said motors comprises supplying pulses (207a) of electrical power supplied to said electric motors that are interspersed with intervals (217a) of no power; and said conveyance comprises means (72) for pulse-width modulating said pulses.

11. A conveyance (10) as claimed in claim 1 in which said first and second motors comprise electric motors (26a and 26b); and
  said conveyance includes means for dynamically braking one of said motors as a function of a reduction in said power supplied to said one motor when said power to said one motor is selectively reduced.

12. A conveyance (10) as claimed in claim 1, in which said first and second motors comprise electric motors (26a, and 26b);
  said motor control means comprises means for dynamically braking said motors; and
  said motor control means comprises means for varying said dynamic braking inversely with respect to said variable supplying of said power.

13. A conveyance (10) as claimed in claim 1 in which said first and second motors comprise electric motors (26a, and 26b);
  said supplying of power to said motors comprises means (332a) for supplying pulses (207a) of electrical power to said electric motors that are interspersed with intervals (217a) of no power;
  said motor control means comprises means for modulating the width (211a) of said pulses to one of said motors in accordance with selective positioning of said manual control means; and
  said conveyance includes means (354a or 356a) for dynamically braking said one electric motor as a function of reduction in said width of said pulses to said one motor.

14. A method for controlling power that is supplied to first (26a and 232a) and second (26b) motors that are drivingly connected to propulsion elements (12a and 12b) of a conveyance (10), which method comprises:
  (a) manually and variably controlling (76a) said supplying of power to said first and second motors;
  (b) automatically limiting (223) the rate of change in the difference in said power supplied to said first and second motors; and
  (c) permitting larger rates of changes in said power supplied to said first and second motors when the rates of changes in power supplied to said first and second motors are generally equal.

15. A method as claimed in claim 14 in which said method further comprises adjusting said limiting of said rate of change in the difference in said power.

16. A method as claimed in claim 14 in which said manually and variably controlling of said supplying of power comprises manually and variably controlling first and second control signals;
  said automatic limiting step comprises automatically limiting the rate of change in the difference in said control signals; and
  said permitting step comprises permitting larger rates of change in said rate of change in the difference in said control signals when said rates of change of said control signals are generally equal.

17. A method as claimed in claim 14 in which said manually and variably controlling of said supplying of power comprises manually and variably controlling first and second control signals;
  said automatic limiting step comprises automatically limiting the rate of change in the difference in said control signals; and
  said step of automatically limiting comprises charging a capacitor (222).

18. A method as claimed in claim 14 in which said manually and variably controlling of said supplying of power comprises manually and variably controlling first and second control signals;
  said automatic limiting step comprises automatically limiting the rate of change in the difference in said control signals;
  said step of automatically limiting comprises charging a capacitor (222); and
  said method further comprises adjustably limiting the rate of said charging of said capacitor.

19. A method as claimed in claim 14 in which said method further comprises dynamically braking one of said motors as a function of a reduction in said power supplied to said one motor.

20. A method as claimed in claim 14 in which said step of supplying power to said motors (26a and 26b) comprises supplying pulses (207a) of electrical power to said motors, and pulse-width modulating (72) the width (211a) of said pulses; and
  said method further comprises dynamically braking one of said motors as a function of reduction in said width of said pulses to said one motor.

21. A method as claimed in claim 14 in which said step of supplying power to said motors (26a and 26b) comprises supplying pulses (207a) of electrical power to said motors, and pulse-width modulating said pulses;
  said controlling step comprises reducing the width (211a) of said pulses supplied to one of said motors, and simultaneously increasing the width (211a) of said pulses supplied to the other of said motors; and
  said method further comprises dynamically braking both of said motors, and varying said dynamic braking of said motors inversely to said reductions and increases in said width of said pulses.

* * * * *